March 18, 1924.
H. WYDLER
1,487,304
AUTOMATIC ACTING APPARATUS FOR MEASURING DEFINITE QUANTITIES OF LIQUIDS
Filed Aug. 9, 1921
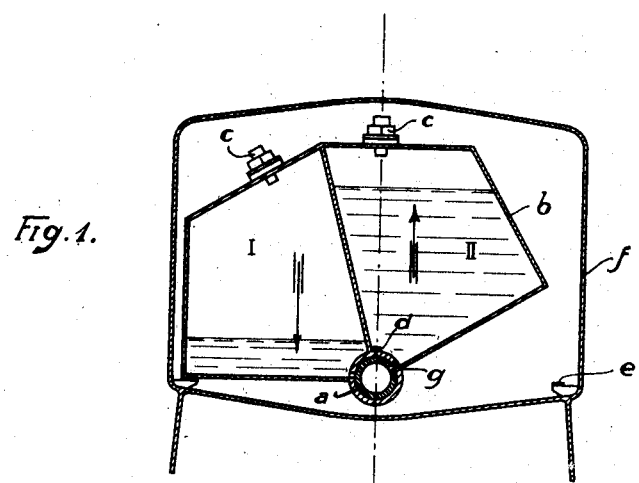
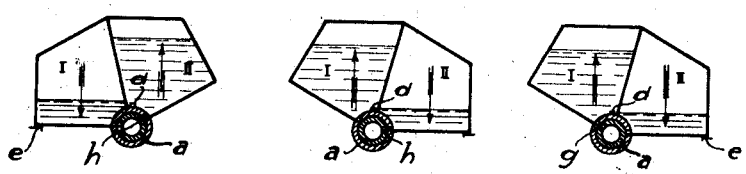
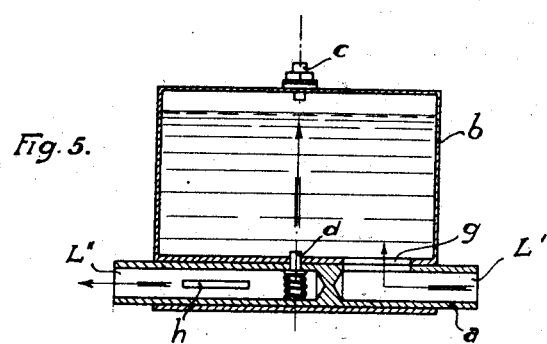
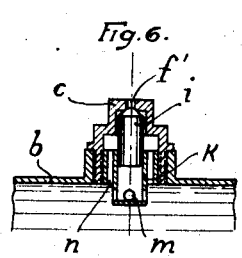
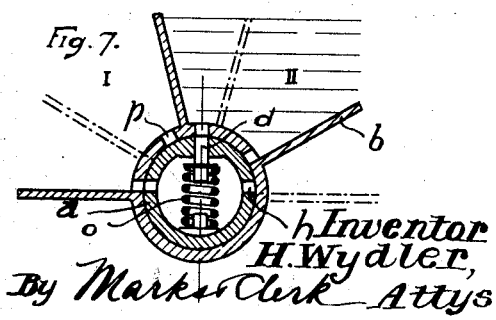
Inventor
H. Wydler,
By Marks & Clerk Attys Patented Mar. 18, 1924.

1,487,304

UNITED STATES PATENT OFFICE.

HERMANN WYDLER, OF BERNE, SWITZERLAND, ASSIGNOR TO SAUSER S. A. FABRIQUE DE VIS DE PRÉCISION, OF SOLEURE, SWITZERLAND.

AUTOMATIC ACTING APPARATUS FOR MEASURING DEFINITE QUANTITIES OF LIQUIDS.

Application filed August 9, 1921. Serial No. 490,981.

*To all whom it may concern:*

Be it known that I, HERMANN WYDLER, a citizen of the Republic of Switzerland, residing at Berne, Switzerland, have invented certain new and useful Improvements in Automatic Acting Apparatus for Measuring Definite Quantities of Liquids, of which the following is a specification.

My invention relates to an automatic acting apparatus for measuring definite quantities of liquids, said apparatus comprising a tank consisting of two chambers which, under the weight of the liquid, alternate by intermittent oscillation, thus causing the liquid to flow in or out of the chambers, the tank being held fast by a locking device.

The invention consists in the fact that the pressure produced when the measuring chamber is full automatically releases a locking device, thus causing the tank to tip up and the outlet ports of one of the chambers, resp. the inlet ports of one chamber and the outlet ports of the other to be shut.

The annexed drawings represent a form of execution of an apparatus according to the invention.

Fig. 1 is a section of the measuring apparatus, through the inlet side, the inlet ports being open for chamber II (tip up position A).

Fig. 2 is a section of the measuring apparatus through the outlet side, the outlet port being open for chamber I (tip up position A).

Fig. 3 is a section through the outlet side, the outlet port being open for chamber II (tip up position B).

Fig. 4 is a section through the inlet side, the inlet port being open for chamber I (tip up position B).

Fig. 5 is a longitudinal section through the measuring apparatus.

Fig. 6 shows the floating closing valve.

Fig. 7 shows, at a greater scale, the locking device.

The measuring apparatus comprises a tank $b$ divided in two chambers, I and II, by a wall. At its lowest part the tank has the form of a nave which is movably mounted on the hollow shaft $a$. The latter comprises a common liquid feed pipe L' and an outlet pipe L (Fig. 5) for both chambers I and II of the tank. In the hollow shaft is provided, on the inlet side, an opening $g$ which, according to the tip up position of the tank, is placed either against the opening of chamber I or against that of chamber II so that for instance in tip up position A (Fig. 1) the inlet port of chamber II is open and at the same time, as shown in Fig. 2, the outlet port $n$ of the nave is against the opening of the shaft, so that the liquid may flow out through the hollow shaft. One of both chambers is thus emptied at the same time the other is filled.

Each of both chambers of the tank is provided with a floating closing valve $c$ allowing the air to flow out; but when the chamber is full of liquid, the latter raises the floater and the chamber is shut.

Fig. 6 shows the valve when shut. When the chamber is emptied, the float $i$ seats in the guide bush. When the chamber is filling up, the air flows out through the opening $f'$ over the float. When the liquid has reached the height of the float, it flows through the opening $m$ in the guide bush and raises the float. As soon as the latter enters in the upper guide piece $c$, said piece being scarcely larger than the float, the air may no more flow out.

The hydraulic pressure thus resulting will quickly press the float against the upper guide piece $c$ so as to completely shut the chamber.

The liquid will of course further be pressed in the chamber and, as the latter is shut, a pressure will result in said chamber.

In order to hold the tank in such a position that at the same time one of the chambers be filled up and the other emptied, a locking device $d$ (Fig. 7) is provided, which is pressed, by a spring $o$, in the opening $e'$ of the nave. The unlocking of said device is caused by the pressure resulting in the chamber as soon as the latter is full. The tipping up of the tank from such a position to the other is caused by the weight of the liquid, as soon as the locking device has been unlocked.

The measuring apparatus may be advantageously mounted in a casing $f$ provided with stops $e$, the shaft $a$ being mounted in said casing.

I claim:

1. An apparatus for automatically measuring definite quantities of liquids including a shaft having inlet and outlet bores and lateral openings communicating therewith, a tank formed with a partition to provide liquid tight chambers and also formed with a nave for oscillatory movement on the shaft, the nave being also provided with inlet and outlet openings for communicating with each of the chambers and coacting with the openings in the shaft so that when one of the chambers is being filled the other is being emptied, the alternate filling and emptying of the chamber effecting an oscillation of the tank, the nave being also provided with additional openings adjacent the partition and a pressure operated locking device mounted in the shaft for alternate association with the last mentioned openings for alternately maintaining the chamber in a filling position until completely filled, substantially as and for the purposes set forth.

2. An apparatus of the kind defined by claim 1 wherein the pressure operated locking device consists of a stud and a spring seated in the outlet bore of the shaft for normally holding the stud in a locking position.

3. An apparatus of the kind defined by claim 1 wherein each of the chambers is formed with a vent and a pressure operable valve associated with the vent for closing the vent upon the filling of the respective chambers.

In testimony whereof I affix my signature.

HERMANN WYDLER.